US012780235B2

(12) United States Patent
Chen et al.

(10) Patent No.: US 12,780,235 B2
(45) Date of Patent: Nov. 3, 2026

(54) COCKPIT SYSTEM AND CONTROL SYSTEM

(71) Applicant: AUO Corporation, Hsinchu City (TW)

(72) Inventors: Yu-Chi Chen, Hsinchu City (TW); Chi-Yu Liu, Hsinchu City (TW); Chia-Sheng Cheng, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/091,876

(22) Filed: Mar. 27, 2025

(65) Prior Publication Data

US 2026/0001570 A1 Jan. 1, 2026

(30) Foreign Application Priority Data

Jun. 28, 2024 (TW) ................................ 113124392

(51) Int. Cl.
*B60W 50/14* (2020.01)
*B60N 2/00* (2006.01)
(Continued)

(52) U.S. Cl.
CPC ........... *B60W 50/14* (2013.01); *B60N 2/0023* (2023.08); *B60R 1/20* (2022.01); *B62D 1/04* (2013.01);
(Continued)

(58) Field of Classification Search
CPC ........... B60W 50/14; B60W 2050/146; B60W 2540/21; B60W 2540/223; B60W 2540/26; B60W 50/08; B60N 2/0023; B60N 2/20; B60N 2210/00; B60N 2220/20; B60N 2/0272; B60N 2/22; B60N 2/002; B60R 1/20; B60R 2300/8006; B60R 1/29; B62D 1/04; B62D 1/183; G06V 20/597; G06V 40/16; G06V 40/20; G06V 40/172; G10L 15/22; G10L 2015/223; G10L 15/00;
(Continued)

(56) References Cited

U.S. PATENT DOCUMENTS 11,325,635 B2 5/2022 Ko
2021/0022259 A1* 1/2021 Song .................... B60Q 1/0023
(Continued)

FOREIGN PATENT DOCUMENTS

CN 112455529 3/2021
CN 113276783 8/2021
(Continued)

*Primary Examiner* — Todd Melton
*Assistant Examiner* — Oliver Tan
(74) *Attorney, Agent, or Firm* — JCIPRNET

(57) ABSTRACT

A cockpit system for use in a vehicle is provided. The cockpit system includes a camera, a flexible touch screen, a steering wheel, and a controller. The camera provides a driving image. The flexible touch screen has a flexible mechanism to control a flexible state of the flexible touch screen. The steering wheel has a foldable mechanism to control a folding state and turning of the steering wheel, and the flexible touch screen is arranged on the steering wheel. The controller is coupled to the camera, the flexible touch screen, and the steering wheel, and the controller determines an operational requirement of a driver based on the driving image and controls the flexible mechanism and the foldable mechanism according to the operational requirement.

19 Claims, 16 Drawing Sheets

(51) Int. Cl.

| | |
|---|---|
| ***B60N 2/20*** | (2006.01) |
| ***B60R 1/20*** | (2022.01) |
| ***B62D 1/04*** | (2006.01) |
| ***G06V 20/59*** | (2022.01) |
| ***G06V 40/16*** | (2022.01) |
| ***G06V 40/20*** | (2022.01) |
| ***G10L 15/22*** | (2006.01) |

(52) U.S. Cl.

CPC ............ *B60N 2/20* (2013.01); *B60N 2210/00* (2023.08); *B60N 2220/20* (2023.08); *B60R 2300/8006* (2013.01); *B60W 2050/146* (2013.01); *B60W 2540/21* (2020.02); *B60W 2540/223* (2020.02); *B60W 2540/26* (2013.01); *G06V 20/597* (2022.01); *G06V 40/16* (2022.01); *G06V 40/20* (2022.01); *G10L 15/22* (2013.01); *G10L 2015/223* (2013.01)

(58) Field of Classification Search

CPC ............ B60K 35/10; B60K 2360/1438; B60K 2360/782; B60K 35/22; B60K 35/223; B60K 2360/175; B60K 35/53; B60K 35/23; B60K 35/29; B60K 35/60; B60K 2360/148; B60K 2360/685

See application file for complete search history.

(56) References Cited

U.S. PATENT DOCUMENTS

| | | | | |
|---|---|---|---|---|
| 2021/0107552 | A1 | 4/2021 | Ha et al. | |
| 2023/0166638 | A1 * | 6/2023 | Kotani ................. | B60N 2/0029 701/49 |
| 2025/0033586 | A1 * | 1/2025 | Kim ....................... | B60K 35/10 |
| 2025/0222938 | A1 * | 7/2025 | Singh ..................... | B60K 35/10 |

FOREIGN PATENT DOCUMENTS

| | | |
|---|---|---|
| CN | 113511255 | 10/2021 |
| CN | 113990187 | 1/2022 |
| CN | 115923913 | 4/2023 |
| CN | 117079545 | 11/2023 |
| KR | 20200027092 | 3/2020 |

* cited by examiner

COCKPIT SYSTEM AND CONTROL SYSTEM

CROSS-REFERENCE TO RELATED APPLICATION

This application claims the priority benefit of Taiwan application serial no. 113124392, filed on Jun. 28, 2024. The entirety of the above-mentioned patent application is hereby incorporated by reference herein and made a part of this specification.

BACKGROUND

Technical Field

The disclosure relates to a driving system, and particularly relates to a cockpit system and a control system.

Description of Related Art

The steering wheel is an important component of a vehicle, through which the driver may control the direction of the vehicle's movement. Moreover, as vehicle functions continue to increase, the control components on the steering wheel are constantly increasing, even to the point of arranging touch screens on the steering wheel to meet the operational requirements of the vehicle. However, as the autonomous driving technology of vehicles matures, the time when the steering wheel is not in use increases, and at this time, the steering wheel merely occupies the interior space of the vehicle unnecessarily. Furthermore, when the vehicle is driving in autonomous mode, the driver/passenger is in a semi-reclined state, making it inconvenient for the driver/passenger to operate the touch screen on the steering wheel. On the other hand, when the driver is manually driving the vehicle, the screen on the steering wheel may interfere with the driver's operation and cause driver distraction.

SUMMARY

The disclosure provides a cockpit system that can control a folding state and turning of a steering wheel as well as a flexible state of a flexible touch screen, so as to adjust the steering wheel and the flexible touch screen in response to an operational requirement of a driver, thereby improving convenience of use and space utilization. Moreover, The disclosure provides a control system.

According to an embodiment of the disclosure, a cockpit system for use in a vehicle includes a camera, a flexible touch screen, a steering wheel, and a controller. The camera provides a driving image. The flexible touch screen has a flexible mechanism to control a flexible state of the flexible touch screen. The steering wheel has a foldable mechanism to control a folding state and turning of the steering wheel, and the flexible touch screen is arranged on the steering wheel. The controller is coupled to the camera, the flexible touch screen, and the steering wheel, and the controller determines an operational requirement of a driver based on the driving image and controls the flexible mechanism and the foldable mechanism according to the operational requirement.

According to an embodiment of the disclosure, a control system for use in a vehicle includes a camera, a flexible touch screen, a steering wheel, and a controller. The camera provides an occupant image. The flexible touch screen has a flexible mechanism to control a flexible state of the flexible touch screen. The controller is coupled to the camera, and the flexible touch screen, and the controller determines an operational requirement of an occupant according to the occupant image, and controls the flexible mechanism according to the operational requirement.

Based on the above, in the cockpit system and the control system provided in one or more embodiments of the disclosure, the controller determines the operational requirement of the driver according to the driving image, so as to adjust the folding/unfolding and turning of the steering wheel and the flexible touch screen in response to the operational requirement of the driver, thereby improving convenience of use and space utilization.

To make the above-mentioned features of the disclosure more comprehensible, embodiments are described in detail below with reference to the accompanying drawings.

DESCRIPTION OF THE EMBODIMENTS

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

It should be understood that, although the terminologies "first," "second," "third," and so forth may serve to describe various elements, components, regions, layers, and/or sections in this disclosure, these elements, components, regions, layers, and/or sections shall not be limited by these terminologies. These terminologies merely serve to distinguish one element, component, region, layer, and/or section from another element, component, region, layer, or section. Thus, a first "element," "component," "region," "layer," or "section" discussed below may be called as a second element, component, region, layer, or section without departing from the teachings herein.

The terminologies used herein are only for the purpose of describing particular embodiments and are not restrictive. As used herein, the singular forms "a," "an," and "the" are intended to include the plural forms including "at least one" or represent "and/or" unless the content clearly indicates otherwise. As used herein, the terminology "and/or" includes any and all combinations of one or more of the associated listed items. It should also be understood that when used in this disclosure, the terminologies "include" and/or "comprise" indicate the presence of the described features, regions, overall scenarios, steps, operations, elements, and/or components but do not exclude the presence or addition of one or more other features, regions, overall scenarios, steps, operations, elements, components, and/or combinations thereof.

Figure 1:
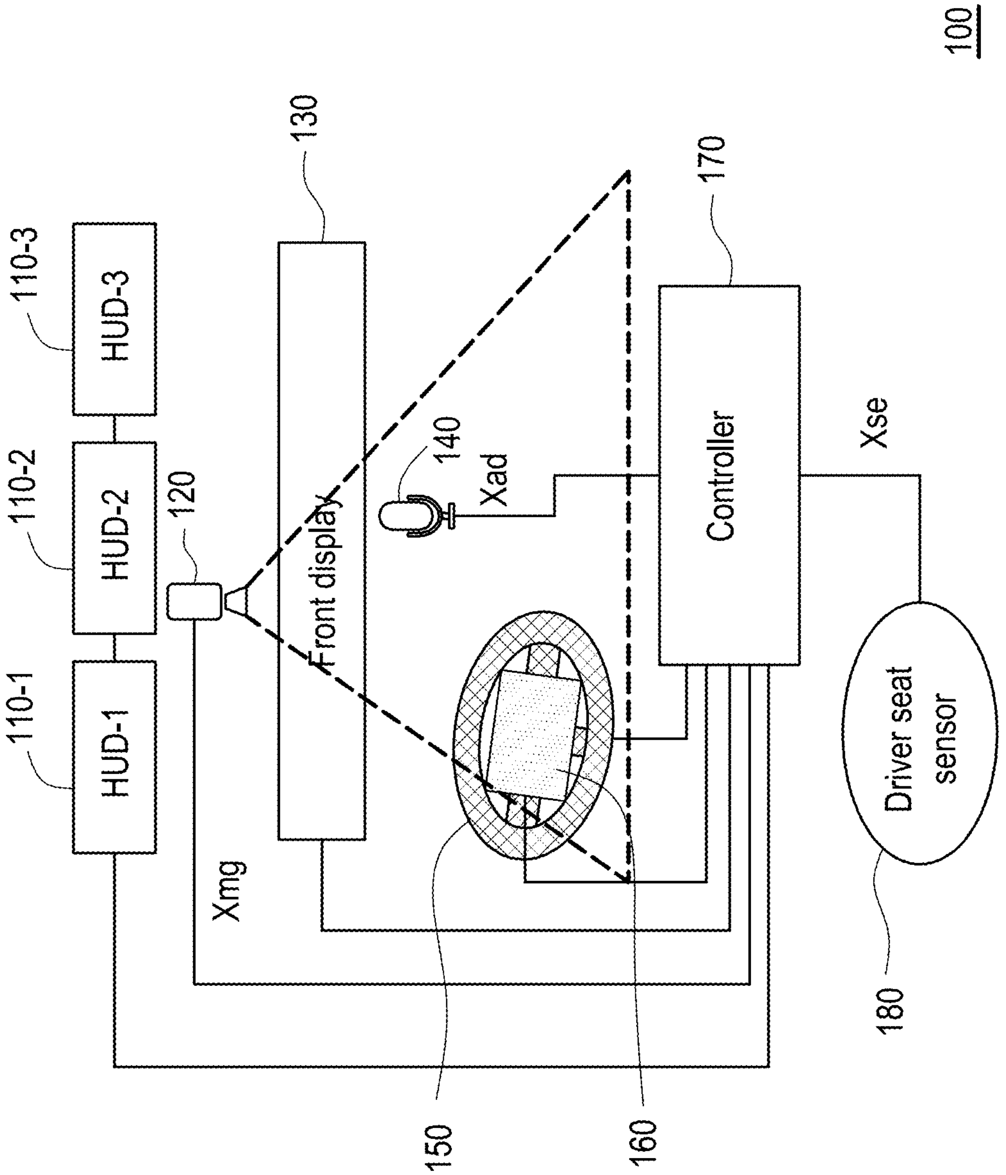
FIG. 1 is a schematic systematic diagram of a cockpit system according to an embodiment of the disclosure.

FIG. 1 is a schematic systematic diagram of a cockpit system according to an embodiment of the disclosure. With reference to FIG. 1, in this embodiment, a cockpit system 100 (may be considered as a control system) can be used in a vehicle (such as a car, a truck, or a trailer truck) and includes at least one head-up display (HUD), for instance (three HUDs 110-1 to 110-3 are taken here for example), a camera 120, a front display 130, a microphone 140, a steering wheel 150, a flexible touch screen 160, a controller 170, and a driver seat sensor 180. The controller 170 is coupled to the HUDs 110-1 to 110-3, the camera 120, the front display 130, the microphone 140, the steering wheel 150, the flexible touch screen 160, and the driver seat sensor 180.

In this embodiment, the camera 120 provides a driving image Xmg to the controller 170. The flexible touch screen 160 has a flexible mechanism to control a flexible state of the flexible touch screen 160. The steering wheel 150 has a foldable mechanism to control a folding state and turning of the steering wheel 150, and the flexible touch screen 160 is arranged on the steering wheel 150. The controller 170 determines an operational requirement of a driver (or an occupant) based on the driving image Xmg, and controls the flexible mechanism and the foldable mechanism according to the operational requirement.

Based on the above, the controller 170 determines the operational requirement of the driver according to the driving image Xmg in response to the operational requirement of the driver for adjusting the retraction/unfolding and turning of the steering wheel and the flexible touch screen, thereby enhancing the convenience of use and space utilization.

In this embodiment, the microphone 140 can be configured to provide a driver's voice Xad. At this time, the controller 170 can determine the operational requirement according to the driving image Xmg and the driver's voice Xad.

In this embodiment, the driver seat sensor 180 can be configured to provide a seat inclination angle signal Xse. At this time, the controller 170 can determine the operational requirement based on the driving image Xmg and the seat inclination angle signal Xse.

In this embodiment of the disclosure, in certain operational scenarios, at least one of the front display 130 and/or at least one of the HUDs 110-1 to 110-3 can be synchronized with the flexible touch screen 160.

Figure 2A:
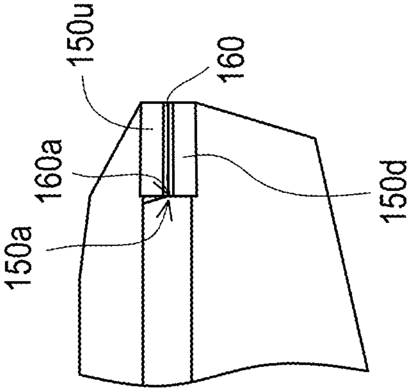
FIG. 2A to FIG. 2C are schematic diagrams showing synchronous folding of a steering wheel and a flexible touch screen according to an embodiment of the disclosure.
Figure 2B:
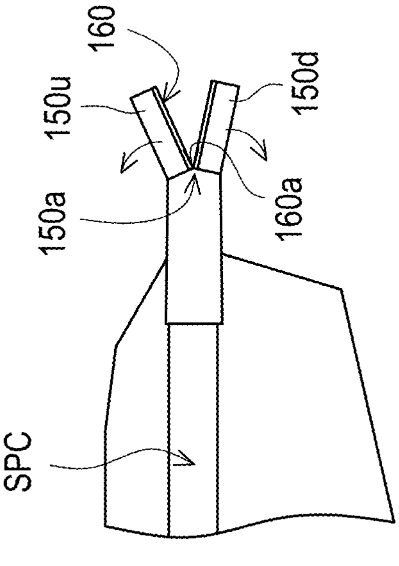
Figure 2C:
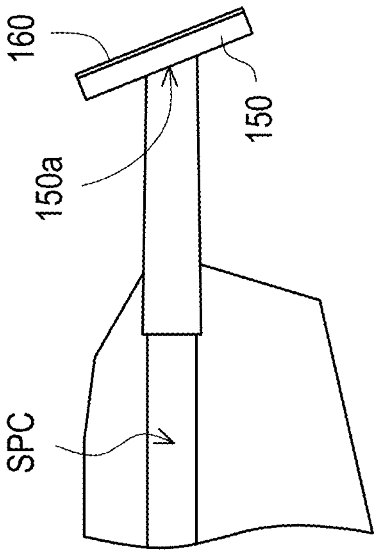

FIG. 2A to FIG. 2C are schematic diagrams showing synchronous folding of a steering wheel and a flexible touch screen according to an embodiment of the disclosure. With reference to FIG. 1 and FIG. 2A to FIG. 2C, FIG. 2A shows that the steering wheel 150 and the flexible touch screen 160 are fully retracted into an accommodation space SPC, FIG. 2B shows a process of extending the steering wheel 150 and the flexible touch screen 160 from the accommodation space SPC, and FIG. 2C shows that the steering wheel 150 and the flexible touch screen 160 are fully unfolded. The steering wheel 150 can control its folding state and turning through a foldable mechanism 150*a*, and the flexible touch screen 160 can control its flexible state through a flexible mechanism 160*a*. When the steering wheel 150 is folded, it is generally divided into an upper part 150*u* and a lower part 150*d*.

Figure 2D:
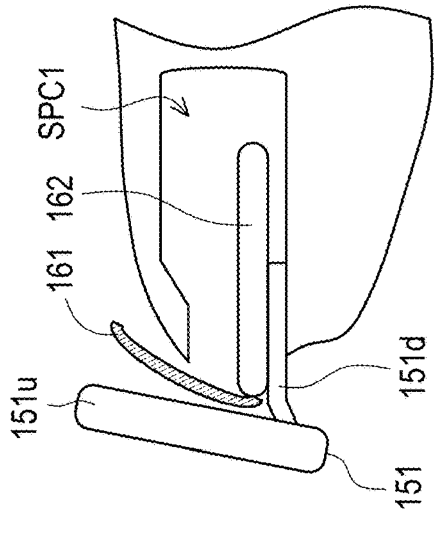
FIG. 2D to FIG. 2F are schematic diagrams showing synchronous folding of a steering wheel and a flexible touch screen according to another embodiment of the disclosure.
Figure 2E:
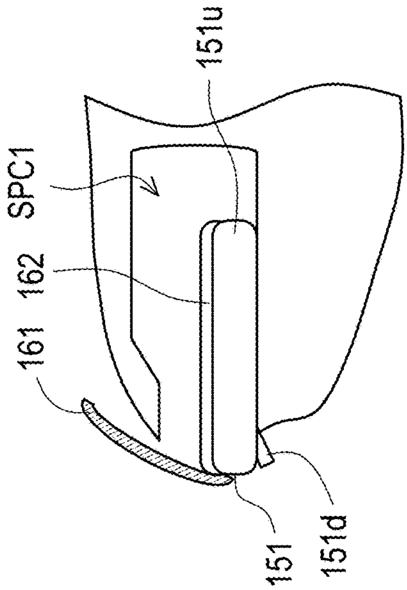
Figure 2F:
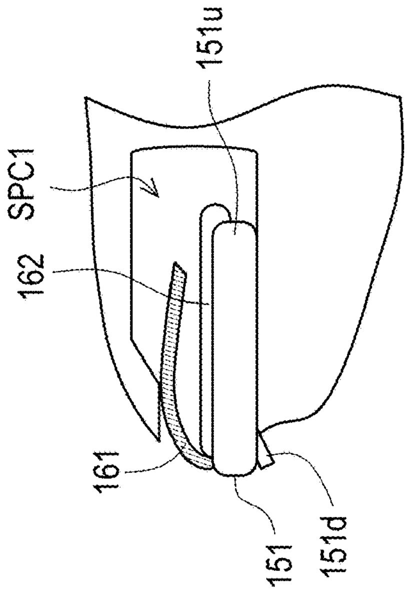

FIG. 2D to FIG. 2F are schematic diagrams showing synchronous folding of a steering wheel and a flexible touch screen according to another embodiment of the disclosure. With reference to FIG. 1 and FIG. 2D to FIG. 2F, FIG. 2F shows that the steering wheel 151 and the flexible touch screen 161 are fully retracted into an accommodation space SPC1, FIG. 2E shows that the steering wheel 151 is fully retracted into the accommodation space SPC1, while the flexible touch screen 161 is still unfolded, and FIG. 2D shows that the steering wheel 150 and the flexible touch screen 160 are fully unfolded. The steering wheel 150 can be bent and folded for accommodation, and the flexible touch screen 160 can be rolled up for accommodation. When the steering wheel 151 is folded, it is generally divided into an upper part 151*u* and a lower part 151*d*. Besides, the flexible touch screen 161 is coupled to a screen stand 162 to be rolled up through the screen stand 162.

Figure 3B:
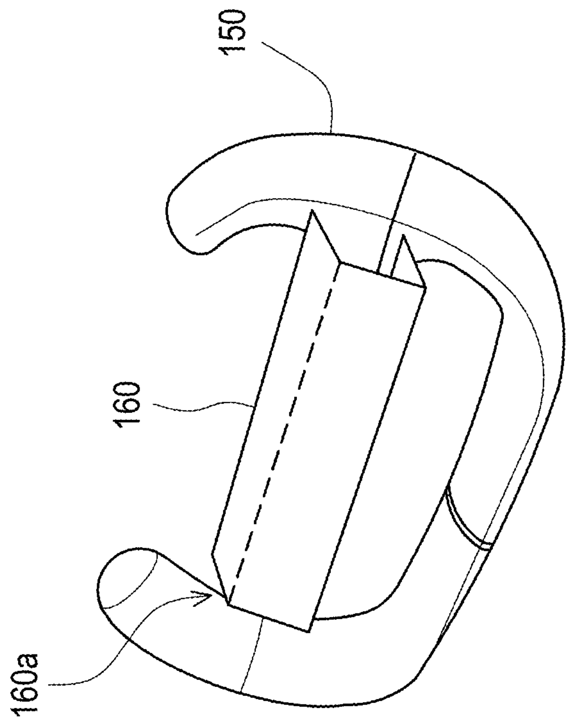
FIG. 3A and FIG. 3B are schematic diagrams showing folding of a flexible touch screen according to an embodiment of the disclosure.
Figure 3A:
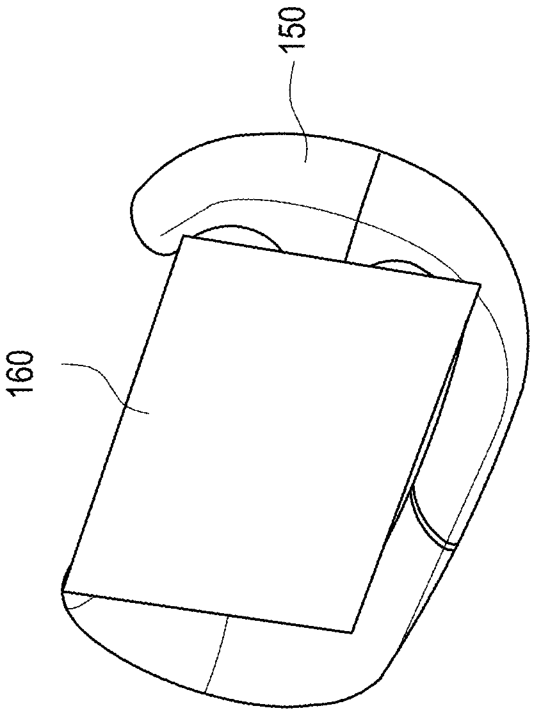

FIG. 3A and FIG. 3B are schematic diagrams showing folding of a flexible touch screen according to an embodiment of the disclosure. With reference to FIG. 1, FIG. 2A to FIG. 2C, and FIG. 3A and FIG. 3B, FIG. 3A shows that the flexible touch screen 160 is fully unfolded, and FIG. 3B shows that the flexible touch screen 160 can be controlled by the flexible mechanism 160*a* to be bent along the structure of the steering wheel 150, and a portion of the flexible touch screen 160 can be shown.

Figure 4:
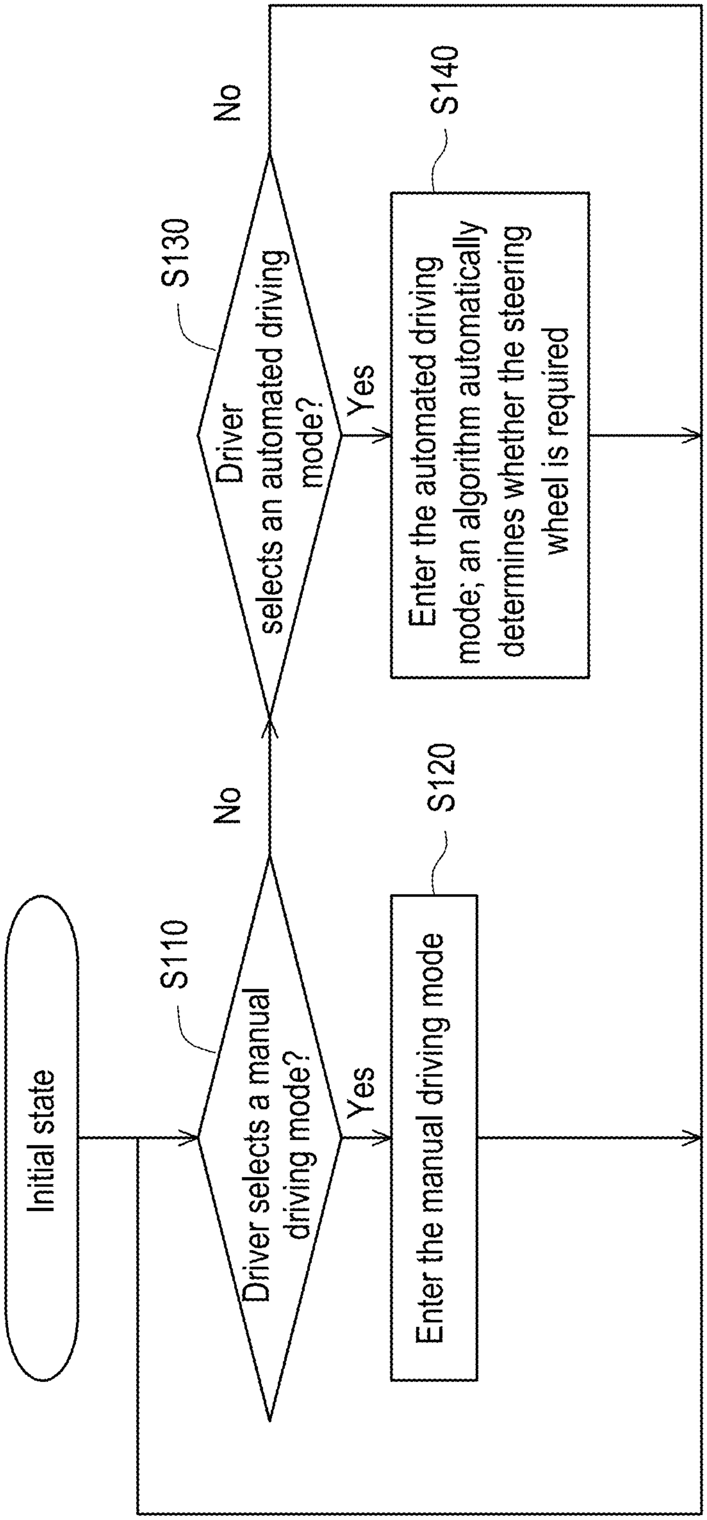
FIG. 4 is a flowchart of selecting a driving mode of a cockpit system according to an embodiment of the disclosure.

FIG. 4 is a flowchart of selecting a driving mode of a cockpit system according to an embodiment of the disclosure. With reference to FIG. 1, FIG. 2A to FIG. 2C, FIG. 3A and FIG. 3B, and FIG. 4, in this embodiment, the controller 170 can determine whether the operational requirement of the driver is a manual driving mode or an automated driving mode based on a user input (such as one of a touch behavior, a gesture, and a voice of the driver), where the initial state can be a state before executing the steps or a preset state of the system, which should not be construed as a limitation to this embodiment of the disclosure. In this embodiment of the disclosure, manual driving can be the default state; for instance, as the steering wheel 150 and the flexible touch screen 160 shown in FIG. 3B, when the driver does not select the automated driving mode, it means the manual driving mode is selected. When the operational requirement is the manual driving, the steering wheel 150 is fully unfolded and oriented toward the driver, and the flexible touch screen 160 is bent to expose a portion of the flexible touch screen 160 to the driver.

As shown in FIG. 4, in step S110, the controller 170 determines whether the operational requirement of the driver is the manual driving mode. If the operational requirement of the driver is the manual driving mode, i.e., when a determination result of step S110 is "yes", step S120 is executed to enter the manual driving mode; on the contrary, if the operational requirement of the driver is not the manual driving mode, i.e., when the determination result of step S110 is "no", step S130 is executed to determine whether the operational requirement of the driver is the automated driving mode.

If the operational requirement of the driver is the automated driving mode, i.e., when a determination result of step S130 is "yes", step S140 is executed to enter the automated driving mode, and an algorithm automatically determines whether the steering wheel is required; on the contrary, if the operational requirement of the driver is not the automated driving mode, i.e., when the determination result of step S130 is "no", returns to step S110.

Figure 5:
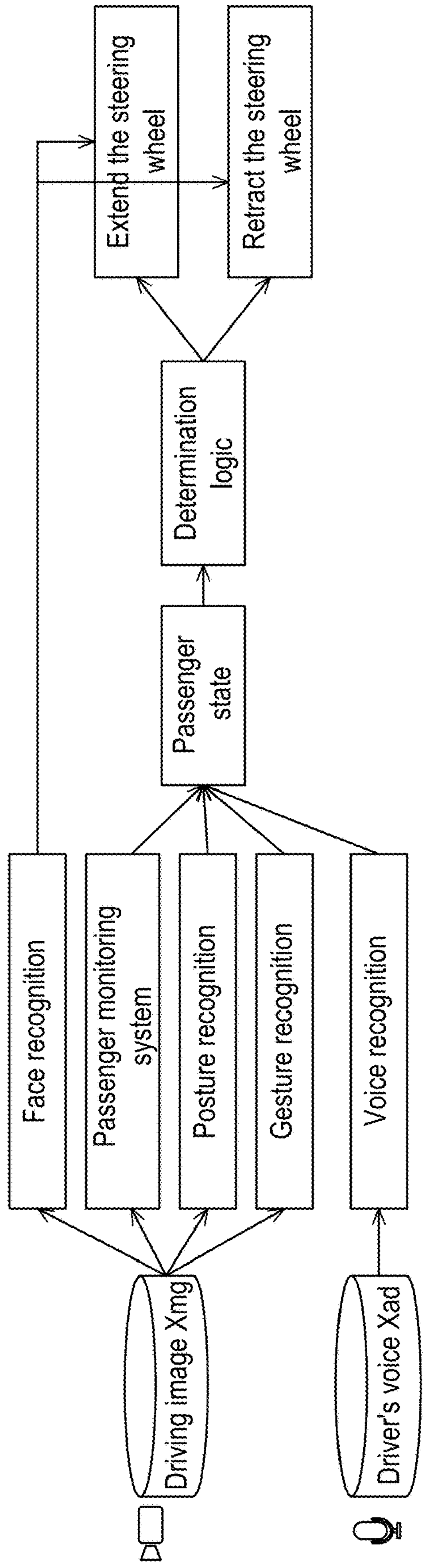
FIG. 5 is a block diagram of analyzing an operational requirement of a cockpit system according to an embodiment of the disclosure.

FIG. 5 is a block diagram of analyzing an operational requirement of a cockpit system according to an embodiment of the disclosure. With reference to FIG. 1, FIG. 2A to FIG. 2C, FIG. 3A and FIG. 3B, and FIG. 5, in this embodiment, when the vehicle is in the automated driving mode, the controller 170 can automatically detect the operational requirement of the driver through an algorithm; namely, the controller 170 can determine whether the driver needs the steering wheel 150 and the flexible touch screen 160.

In this embodiment, the controller 170 can apply a face recognition algorithm to determine whether the driver has a preset steering wheel setting (in response to the operational requirement of the driver) based on the driving image Xmg, so as to decide whether the steering wheel should be extended or retracted.

In this embodiment, the controller 170 can apply a passenger monitoring system algorithm to determine a passenger status of the driver based on the driving image Xmg and then analyze the passenger status (e.g., whether the passenger enters a sleep state) through a determination logic to obtain the corresponding operational requirement of the driver, ultimately deciding whether the steering wheel should be extended or retracted.

In this embodiment, the controller 170 can apply a posture recognition algorithm to determine the passenger status of the driver based on the driving image Xmg and then analyze the passenger status through the determination logic to obtain the corresponding operational requirement of the driver, ultimately deciding whether the steering wheel should be extended or retracted.

In this embodiment, the controller 170 can apply a gesture recognition algorithm to determine the passenger status of the driver based on the driving image Xmg and then analyze the passenger status through the determination logic to obtain the corresponding operational requirement of the driver, ultimately deciding whether the steering wheel should be extended or retracted.

In this embodiment, the controller 170 can apply a voice recognition algorithm to determine whether at least one voice command exists in the driver's voice Xad, so as to determine the passenger status of the driver based on the at least one voice command and then analyze the passenger status through the determination logic to obtain the corresponding operational requirement of the driver, ultimately deciding whether the steering wheel should be extended or retracted.

Figure 6:
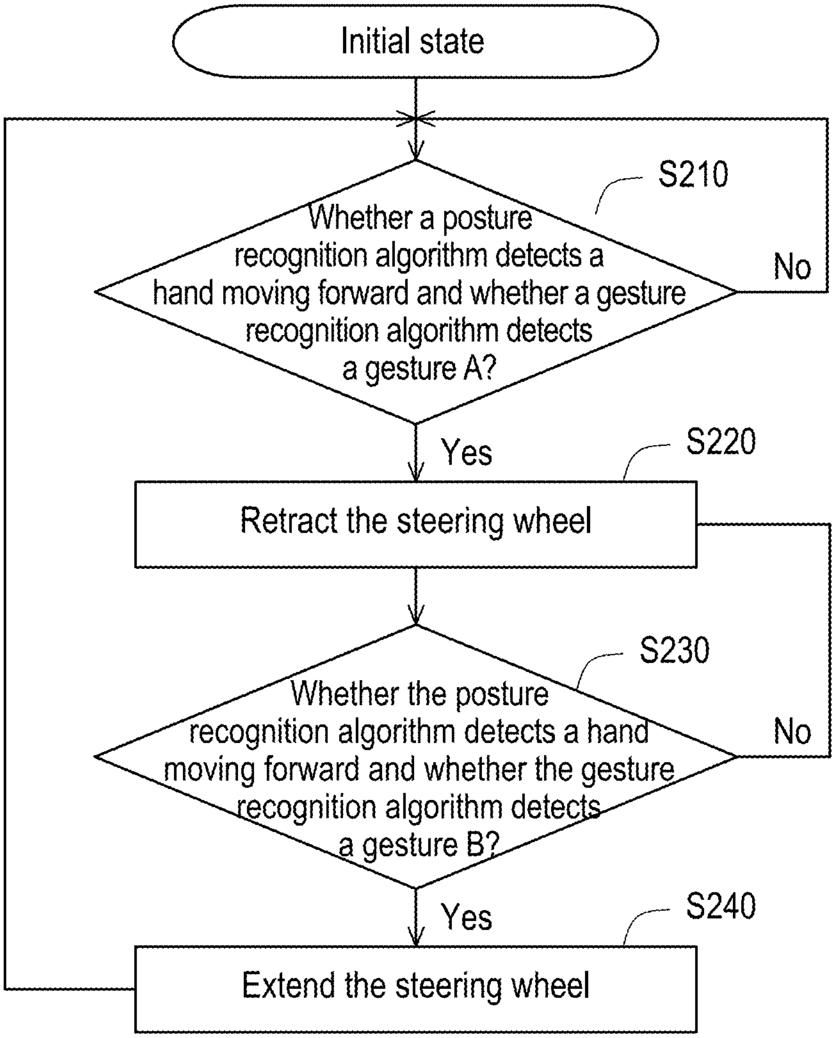
FIG. 6 is a flowchart of analyzing an operational requirement by applying a posture recognition algorithm and a gesture recognition algorithm of a cockpit system according to an embodiment of the disclosure.

FIG. 6 is a flowchart of analyzing an operational requirement by applying a posture recognition algorithm and a gesture recognition algorithm of a cockpit system according to an embodiment of the disclosure. With reference to FIG. 1, FIG. 5 and FIG. 6, in this embodiment, in step S210, it is determined whether the posture recognition algorithm detects a hand moving forward and whether the gesture recognition algorithm detects a gesture A. When the posture recognition algorithm detects a hand moving forward and the gesture recognition algorithm detects the gesture A, i.e., a determination result of step S210 is "yes", then step S220 is executed to retract the steering wheel; one the contrary, when the posture recognition algorithm does not detect any hand moving forward or the gesture recognition algorithm does not detect the gesture A, i.e., the determination result of step S210 is "no", then return to step S210. After step S220, step S230 is executed.

In step S230, it is determined whether the posture recognition algorithm detects a hand moving forward and whether the gesture recognition algorithm detects a gesture B. When the posture recognition algorithm detects a hand moving forward and the gesture recognition algorithm detects the gesture B, i.e., a determination result of step S230 is "yes", then step S240 is executed to extend the steering wheel; on the contrary, when the posture recognition algorithm does not detect any hand moving forward or the gesture recognition algorithm does not detect the gesture B, i.e., the determination result of step S230 is "no", then return to step S230. After step S240, return to step S210.

Figure 7:
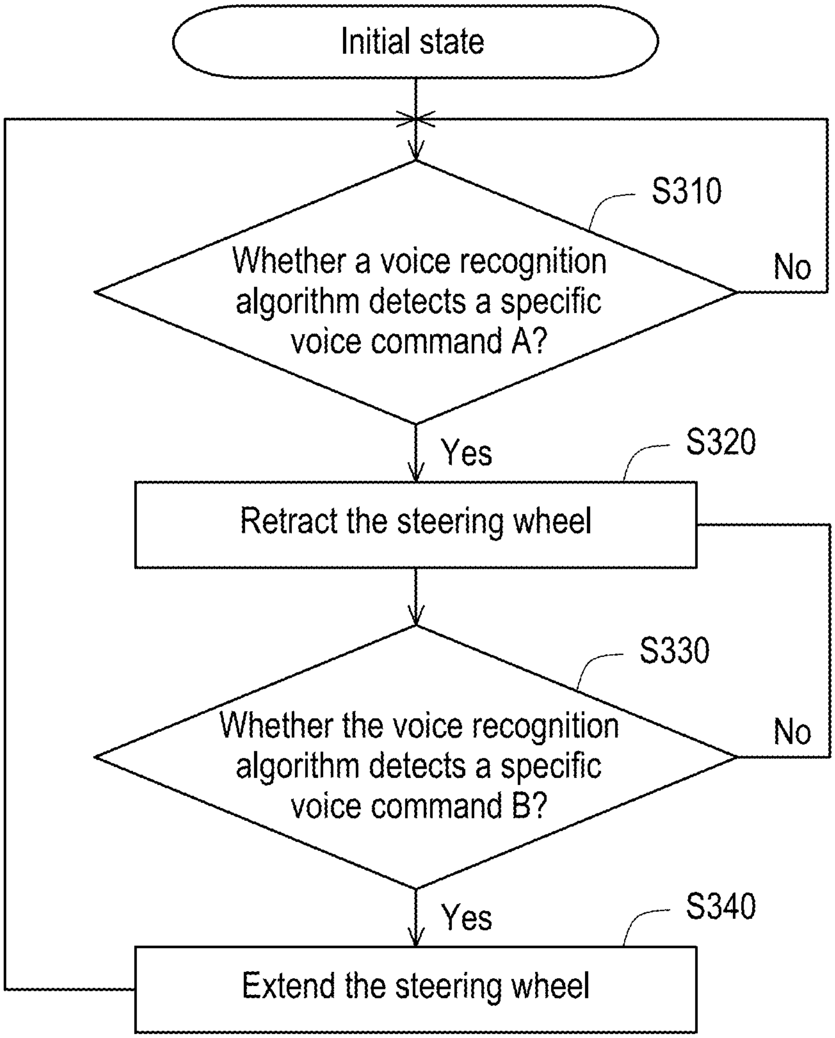
FIG. 7 is a flowchart of analyzing an operational requirement by applying a voice recognition algorithm of a cockpit system according to an embodiment of the disclosure.

FIG. 7 is a flowchart of analyzing an operational requirement by applying a voice recognition algorithm of a cockpit system according to an embodiment of the disclosure. With reference to FIG. 1, FIG. 5 and FIG. 7, in this embodiment, in step S310, it is determined whether the voice recognition algorithm detects a specific voice command A. When the voice recognition algorithm detects the specific voice command A, i.e., a determination result of step S310 is "yes", then step S320 is executed to retract the steering wheel; on the contrary, when the voice recognition algorithm does not detect the specific voice command A, i.e., the determination result of step S310 is "no", then return to step S310. After step S320, step S330 is executed.

In step S330, it is determined whether the voice recognition algorithm detects a specific voice command B. When the voice recognition algorithm detects the specific voice command B, i.e., a determination result of step S330 is "yes", then step S340 is executed to extend the steering wheel; on the contrary, when the voice recognition algorithm does not detect the specific voice command B, i.e., the determination result of step S330 is "no", then return to step S330. After step S340, return to step S310.

Figure 8:
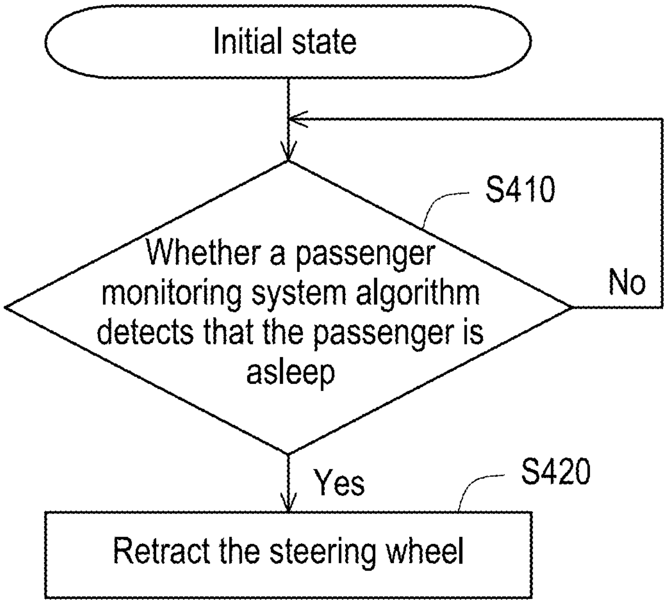
FIG. 8 is a flowchart of analyzing an operational requirement by applying a passenger monitoring system algorithm of a cockpit system according to an embodiment of the disclosure.

FIG. 8 is a flowchart of analyzing an operational requirement by applying a passenger monitoring system algorithm of a cockpit system according to an embodiment of the disclosure. With reference to FIG. 1, FIG. 5 and FIG. 8, in this embodiment, in step S410, it is determined whether the passenger monitoring system algorithm detects that the passenger is asleep. When the passenger monitoring system algorithm detects that the passenger is asleep, i.e., a determination result of step S410 is "yes", then step S420 is executed to retract the steering wheel; on the contrary, when the passenger monitoring system algorithm does not detect that the passenger is asleep, i.e., the determination result of step S410 is "no", then return to step S410.

Figure 9:
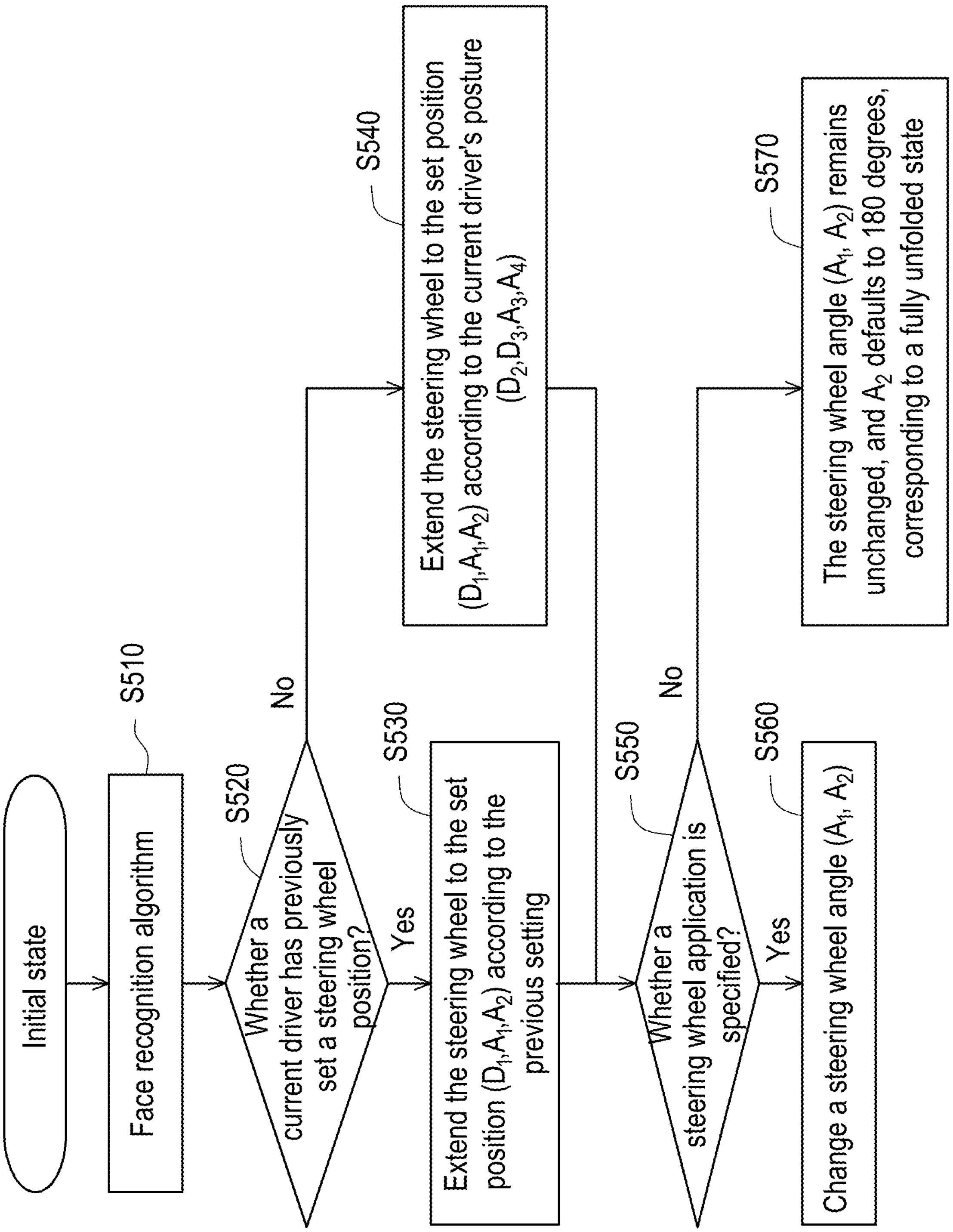
FIG. 9 is a flowchart of analyzing an operational requirement by applying a face recognition algorithm and a seat inclination angle signal of a cockpit system according to an embodiment of the disclosure.
Figure 10A:
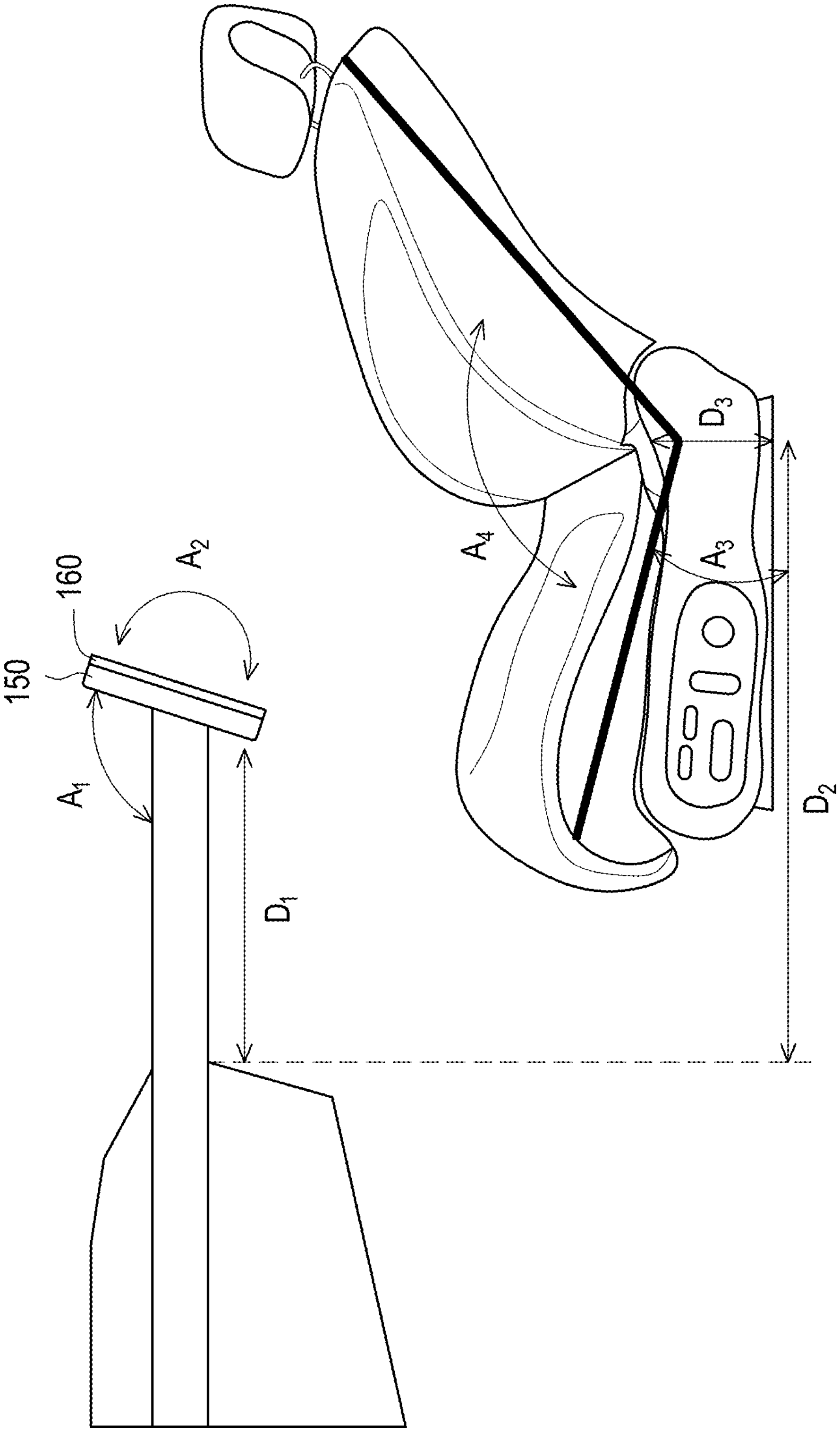
FIG. 10A is a schematic structural diagram of controlling a steering wheel and a flexible touch screen by applying a face recognition algorithm and a seat inclination angle signal of a cockpit system according to an embodiment of the disclosure.

FIG. 9 is a flowchart of analyzing an operational requirement by applying a face recognition algorithm and a seat inclination angle signal of a cockpit system according to an embodiment of the disclosure. FIG. 10A is a schematic structural diagram of controlling a steering wheel and a flexible touch screen by applying a face recognition algorithm and a seat inclination angle signal of a cockpit system according to an embodiment of the disclosure. With reference to FIG. 1, FIG. 5, FIG. 9, and FIG. 10A, in this embodiment, in step S510, the face recognition algorithm is executed to recognize the identity of the current driver. In step S520, it is determined whether the current driver has previously set the steering wheel position. When it is determined that the current driver has previously set the steering wheel position, i.e., a determination result of step S520 is "yes", then step S530 is executed to extend the steering wheel to the set position ($D_1$,$A_1$,$A_2$) according to the previous setting; on the contrary, when it is determined that the current driver has not set the steering wheel position, i.e., the determination result of step S520 is "no", then step S540 is executed to extend the steering wheel to the set position ($D_1$,$A_1$,$A_2$) according to the current driver's posture ($D_2$, $D_3$,$A_3$,$A_4$). After steps S530 and S540, step S550 is executed.

In step S550, it is determined whether a steering wheel application is specified. When the steering wheel application is specified, i.e., a determination result of step S550 is "yes," then step S560 is executed to change a steering wheel angle ($A_1$, $A_2$). On the contrary, when no steering wheel application is specified, i.e., the determination result of step S550 is "no," then step S570 is executed, so that the steering wheel angle ($A_1$, $A_2$) remains unchanged, and $A_2$ defaults to 180 degrees, corresponding to a fully unfolded state (i.e., fully deployed).

Here, $D_1$ is a distance by which the steering wheel 150 extends outward from the dashboard, $A_1$ is an angle between the upper edge of the steering wheel 150 and the steering column, $A_2$ is an angle between the upper edge and the lower edge of the steering wheel 150 (i.e., the angle of the flexible touch screen 160), $D_2$ is a distance between the seat center and the dashboard, $D_3$ is the seat height, $A_3$ is an angle between the floor and the seat surface, and $A_4$ is an angle between the seat surface and the seat back.

In the embodiments depicted in FIG. 4 and FIG. 6 to FIG. 9, the sequence of steps S110, S120, S130, S140, S210, S220, S230, S240, S310, S320, S330, S340, S410, S420, S510, S520, S530, S540, 550, S560, and S570 is provided for illustrative purposes and should not be construed as limitations to the embodiments of this disclosure. Moreover, the details of steps S110, S120, S130, S140, S210, S220, S230, S240, S310, S320, S330, S340, S410, S420, S510, S520, S530, S540, 550, S560, and S570 may be learned from the content described in the embodiments depicted in FIG. 1 to FIG. 10F.

Figure 10B:
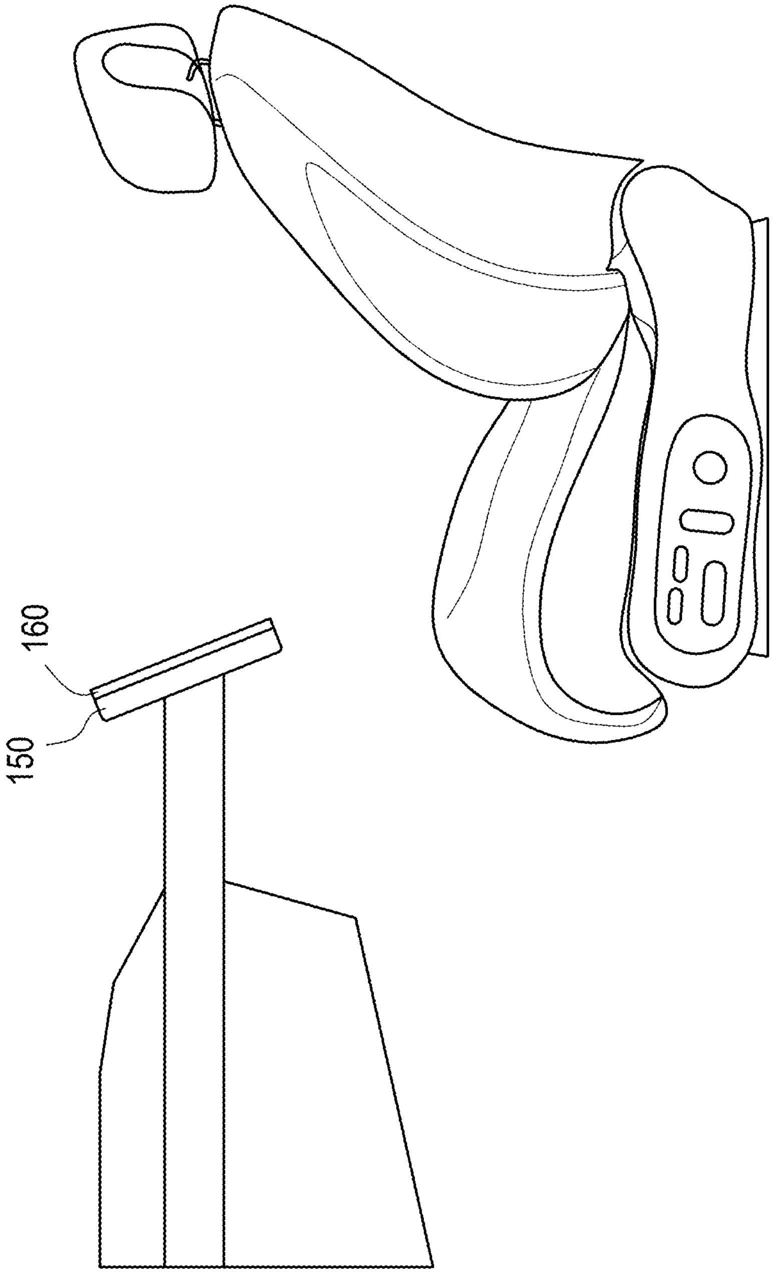
FIG. 10B and FIG. 10C are schematic structural diagrams of a cockpit system in a tablet operation mode according to an embodiment of the disclosure.
Figure 10C:
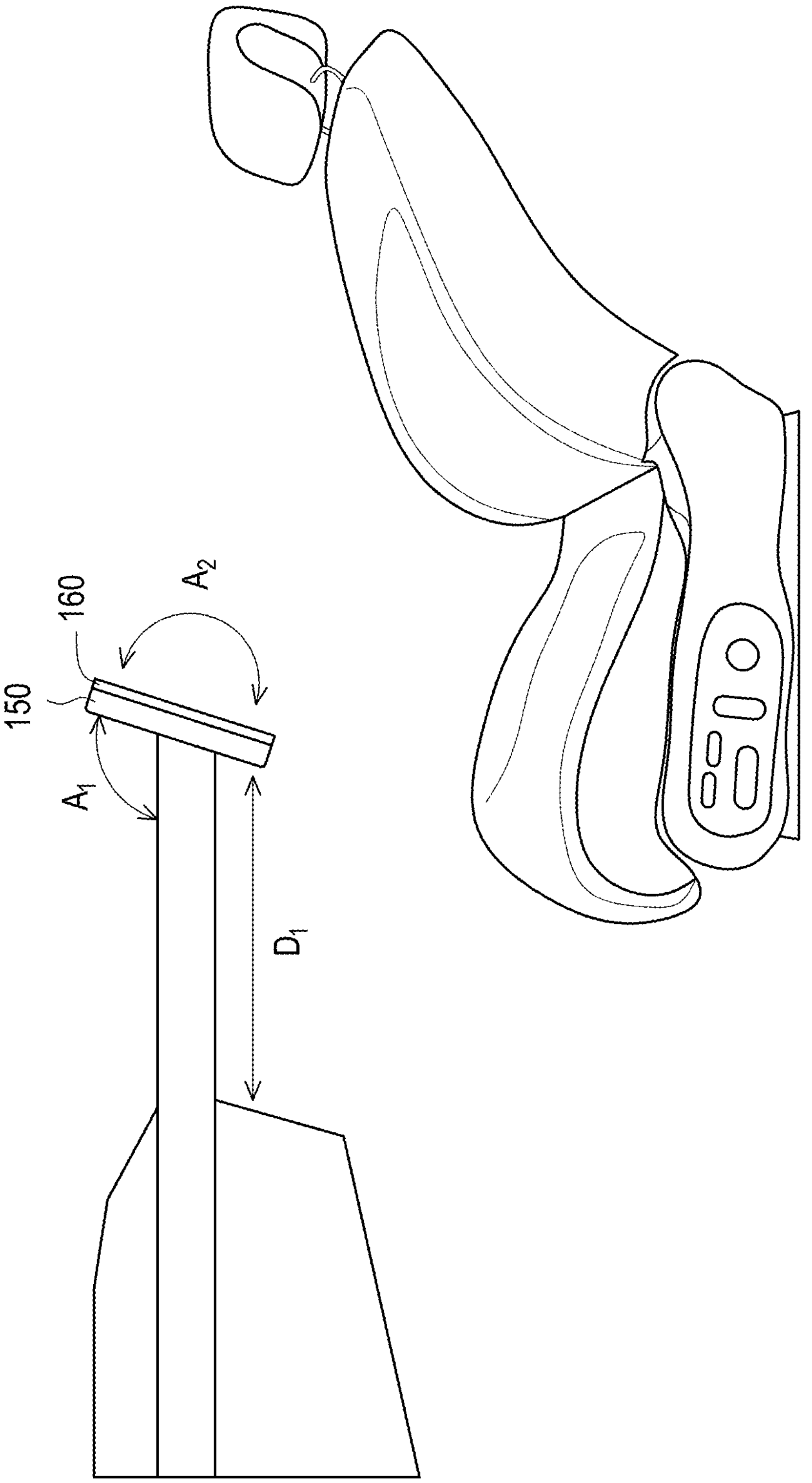

FIG. 10B and FIG. 10C are schematic structural diagrams of a cockpit system in a tablet operation mode according to an embodiment of the disclosure. With reference to FIG. 1, FIG. 10B, and FIG. 10C, in this embodiment, when the operational requirement is a tablet operation, the steering wheel 150 and the flexible touch screen 160 are fully unfolded and oriented toward the driver, i.e., the steering wheel is extended to a specified position ($D_1$,$A_1$,$A_2$). Moreover, in the tablet operation mode, when it is necessary to set or control audio-visual entertainment content, the flexible touch screen 160 can be applied for the control, and the flexible touch screen 160 and at least one of the front display 130 and/or the HUDs 110-1 to 110-3 can be synchronized to share the audio-visual entertainment content to the front display.

At this time, when it is necessary to control the audio-visual entertainment content, the flexible touch screen 160 on the steering wheel 150 can be applied for the control, allowing the driver/passenger to avoid having to get up to touch the front display 130. The driver can execute personal private operations through the flexible touch screen 160, such as conducting private conferences, running chat applications, or making personal investments. Moreover, based on the size of the flexible touch screen 160, its distance from the driver, and its operability, it is suitable for creative applications and/or gaming applications.

Figure 10D:
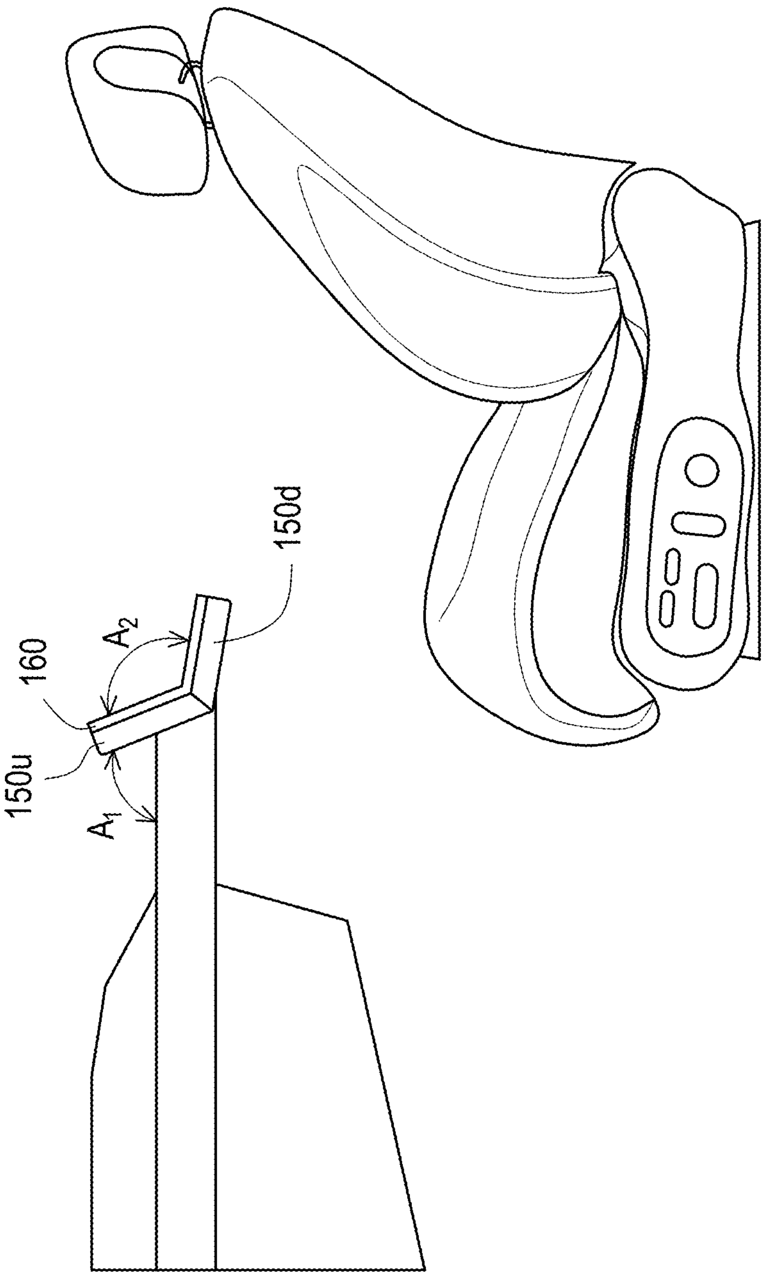
FIG. 10D and FIG. 10E are schematic structural diagrams of a cockpit system in a laptop operation mode according to an embodiment of the disclosure.
Figure 10E:
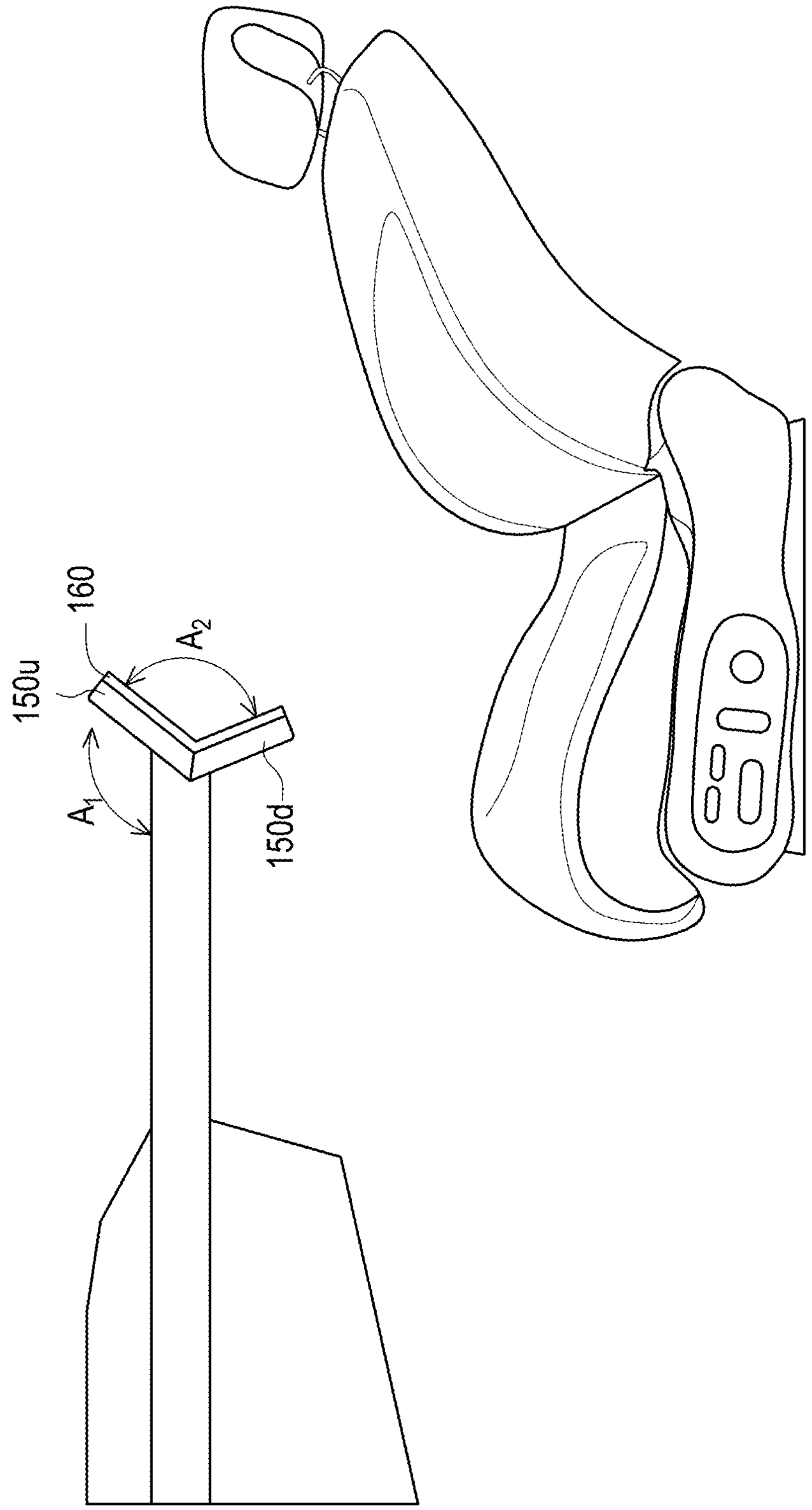

FIG. 10D and FIG. 10E are schematic structural diagrams of a cockpit system in a laptop operation mode according to an embodiment of the disclosure. With reference to FIG. 1, FIG. 10D, and FIG. 10E, in this embodiment, when the operational requirement is a laptop operation, the steering wheel 150 and the flexible touch screen 160 are unfolded (i.e., the angle $A_2$ is less than 180 degrees but greater than 90 degrees) and oriented toward the driver, i.e., the angle $A_1$ is adjusted in response to the driver's position.

Figure 10F:
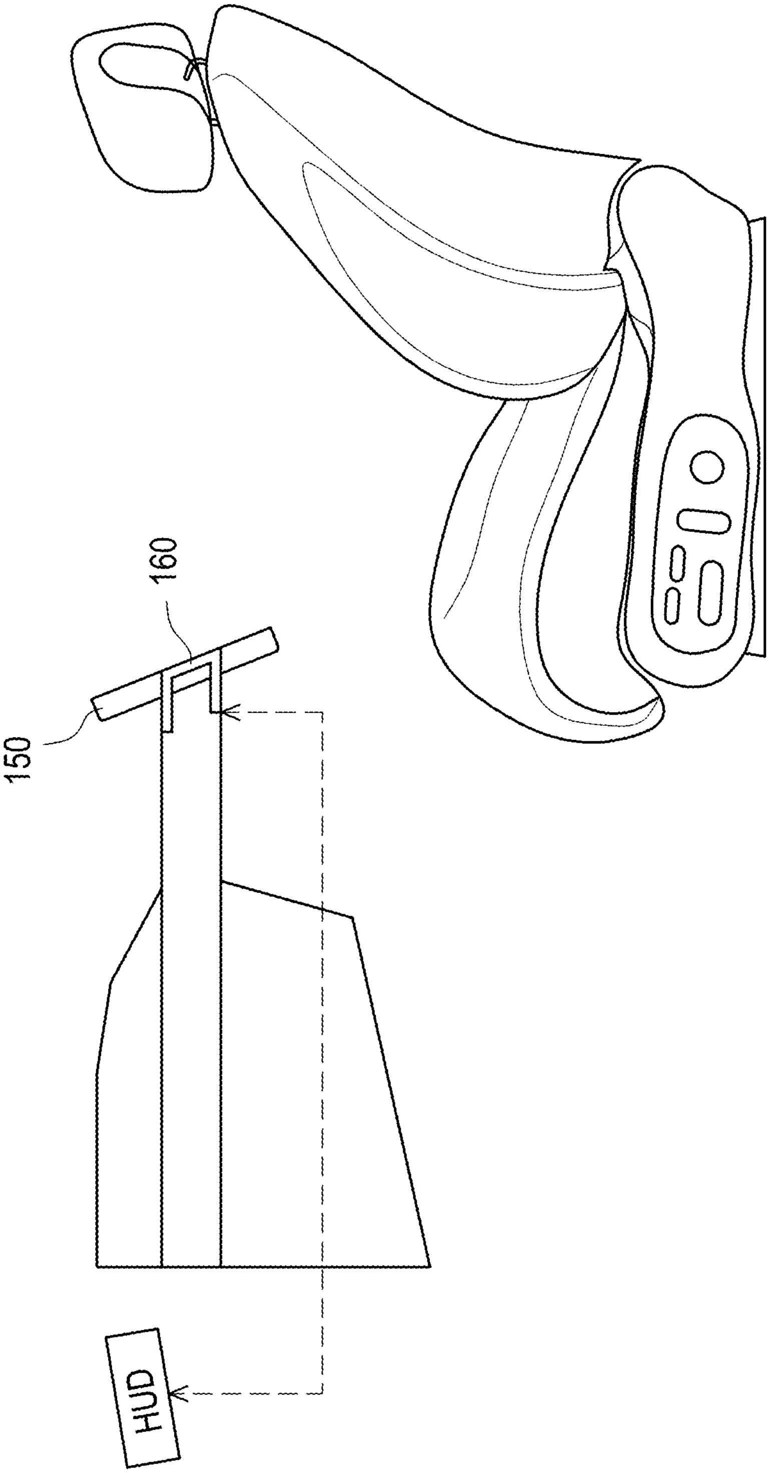
FIG. 10F is a schematic structural diagram of a cockpit system in a manual driving mode according to an embodiment of the disclosure.

FIG. 10F is a schematic structural diagram of a cockpit system in a manual driving mode according to an embodiment of the disclosure. With reference to FIG. 1 and FIG. 10F, in this embodiment, when the operational requirement is manual driving, the steering wheel 150 is fully unfolded and oriented toward the driver, and the flexible touch screen 160 is bent to expose a portion of the flexible touch screen 160 to the driver, where the exposed portion of the flexible touch screen 160 to the driver may display necessary control functions or may be customized by the driver.

In one or more embodiments of the disclosure, when the driver reclines, the steering wheel 150 and the flexible touch screen 160 can automatically extend the flexible touch screen 160 in front of the driver based on the seat back reclining angle and the driver's setting data. Moreover, the angle of the flexible touch screen 160 can be changed according to the needs of the driver.

Based on the above, one or more embodiments of the disclosure are directed to the field of vehicle technology, proposing an operation method for a foldable steering wheel and a flexible touch screen. In this method, the folded steering wheel can be automatically detected, increasing interior space when the driver/passenger reclines the seat back to rest. Moreover, the foldable flexible touch screen is arranged on the foldable steering wheel. When it is necessary to control the audio-visual entertainment content, the flexible touch screen on the steering wheel can be applied for the control, allowing the driver/passenger to avoid having to get up to touch the front display, thereby enhancing user experience. Moreover, when the vehicle is manually driven, the flexible touch screen is minimized to reduce the chance of driver distraction.

To sum up, in the cockpit system provided in one or more embodiments of the disclosure, the controller determines the operational requirement of the driver based on the driving image, and adjusts the folding/unfolding and turning of the steering wheel and the flexible touch screen in response to the operational requirement of the driver, thereby enhancing convenience of use and space utilization.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A cockpit system for use in a vehicle, the cockpit system comprising:
- a camera, providing a driving image;
- a flexible touch screen, having a flexible mechanism to control a flexible state of the flexible touch screen;
- a steering wheel, having a foldable mechanism to control a folding state of the steering wheel, the flexible touch screen being arranged on the steering wheel; and
- a controller, coupled to the camera, the flexible touch screen, and the steering wheel, determining an operational requirement of a driver according to the driving image, and controlling the flexible mechanism and the foldable mechanism according to the operational requirement to determine the flexible touch screen and the steering wheel to be either folded and unfolded, respectively,
- wherein the flexible touch screen and the steering wheel are fully retracted into an accommodation space after folding.

2. The cockpit system according to claim 1, further comprising a microphone for providing a driver's voice,
- wherein the controller is further coupled to the microphone to determine the operational requirement based on the driving image and the driver's voice.

3. The cockpit system according to claim 2, wherein the controller determines whether at least one voice command exists in the driver's voice by applying a voice recognition algorithm to determine the operational requirement based on the at least one voice command.

4. The cockpit system according to claim 1, further comprising a driver seat sensor for providing a seat inclination angle signal,
- wherein the controller is further coupled to the driver seat sensor to determine the operational requirement based on the driving image and the seat inclination angle signal.

5. The cockpit system according to claim 1, wherein the controller determines whether the driver has a preset steering wheel setting based on the driving image by applying a face recognition algorithm to determine the operational requirement of the driver.

6. The cockpit system according to claim 1, wherein the controller determines whether the driver has entered a sleep state based on the driving image by applying a passenger monitoring system algorithm to determine the operational requirement of the driver.

7. The cockpit system according to claim 1, wherein the controller determines a passenger status of the driver based on the driving image by applying a posture recognition algorithm to determine the operational requirement of the driver.

8. The cockpit system according to claim 1, wherein the controller determines a passenger status of the driver based on the driving image by applying a gesture recognition algorithm to determine the operational requirement of the driver.

9. The cockpit system according to claim 1, wherein when the operational requirement is manual driving, the steering wheel is fully unfolded and oriented toward the driver, and the flexible touch screen is bent to expose a portion of the flexible touch screen to the driver.

10. The cockpit system according to claim 1, wherein when the operational requirement is a tablet operation, the steering wheel and the flexible touch screen are fully unfolded and oriented toward the driver.

11. The cockpit system according to claim 10, further comprising a front display and/or at least one head-up display, wherein at least one of the front display and the at least one head-up display is synchronized with the flexible touch screen.

12. The cockpit system according to claim 1, wherein when the operational requirement is a laptop operation, the steering wheel and the flexible touch screen are unfolded and oriented toward the driver.

13. The cockpit system according to claim 1, wherein when the operational requirement is a sleep operation, the steering wheel and the flexible touch screen are fully folded and retracted into the accommodation space of the vehicle.

14. The cockpit system according to claim 1, wherein the flexible mechanism of the steering wheel further controls a turning of the steering wheel.

15. A control system for use in a vehicle, the control system comprising:
- a camera, providing an occupant image;
- a flexible touch screen, having a flexible mechanism to control a flexible state of the flexible touch screen;
- a steering wheel, having a foldable mechanism to control a folding state and turning of the steering wheel, the flexible touch screen being arranged on the steering wheel; and
- a controller, coupled to the camera, the steering wheel and the flexible touch screen, determining an operational requirement of an occupant according to the occupant image, and controlling the flexible mechanism and the foldable mechanism according to the operational requirement to determine the flexible touch screen and the steering wheel to be either folded and unfolded, respectively,
- wherein the flexible touch screen and the steering wheel are fully retracted into an accommodation space after folding.

16. The control system according to claim 15, further comprising a microphone for providing an occupant's voice,
- wherein the controller is further coupled to the microphone to determine the operational requirement based on the occupant image and the occupant's voice.

17. The control system according to claim 15, further comprising an occupant seat sensor for providing a seat inclination angle signal,
- wherein the controller is further coupled to the occupant seat sensor to determine the operational requirement based on the occupant image and the seat inclination angle signal.

18. The control system according to claim 15, wherein the controller determines whether the occupant has entered a sleep state based on the occupant image by applying a passenger monitoring system algorithm to determine the operational requirement of the occupant.

19. The control system according to claim 15, wherein the controller determines a passenger status of the occupant based on the occupant image by applying a posture recognition algorithm to determine the operational requirement of the occupant.

* * * * *